Nov. 5, 1957 A. A. HAUSER 2,812,132

ELECTRONIC COMPUTER

Filed Jan. 16, 1951 3 Sheets-Sheet 1

INVENTOR
ARTHUR A. HAUSER
BY L. J. Craddock
ATTORNEY

INVENTOR
ARTHUR A. HAUSER
BY C. J. Craddock
ATTORNEY

INVENTOR
ARTHUR A. HAUSER
BY L. V. Craddock
ATTORNEY

2,812,132

ELECTRONIC COMPUTER

Arthur A. Hauser, Garden City, N. Y., assignor to Sperry Rand Corporation, a corporation of Delaware Application January 16, 1951, Serial No. 206,231

8 Claims. (Cl. 235—61)

The present invention relates, generally, to computing devices and in particular relates to analogue computers which are predominately electrical in operation.

In the past, computing devices for naval, military and commercial applications have been predominately mechanical in nature. Only within the past ten years has there been any sizeable effort devoted to the development of computers which might truly be called electromechanical. Thus, mechanical computing techniques and, in particular, those utilizing straight-bar linkages, have been developed to a much greater extent than have corresponding electrical techniques.

It is, therefore, an object of the present invention to provide an analogue computer which is essentially electrical in operation.

It is another object of the present invention to provide apparatus capable of producing the product of two electrical signals, said product being electrical.

It is still another object of the present invention to provide an electrical analogue computer which supplies an electrical signal which is the quotient of two input signals.

It is still another object of the present invention to provide an electrical analogue computer which will provide an output which is equal to the input raised to a desired power.

Still another object of the present invention is to provide an electrical analogue computer which provides an output which is equal to a desired root of the input.

Yet another object of the present invention is to provide an electrical analogue computer which provides an output which is any desired function of an input signal.

Briefly the invention comprises the application of alternating voltages represented by means of vectors in a plane to represent geometrical structures involving straight lines. If these geometric structures are allowed certain motions subject to constraints among their elements then the alternating voltages which represent the lines of the geometric structure must be allowed the same motions subject to the same constraints if they are to continue to represent these geometric structures throughout their various admissible configurations.

In straight bar plane linkages the only motions possible are:

(*a*) A change in the length of the various members.

(*b*) A change in the orientation of the various members.

When a given set of members, the input members, are subjected to these motions, the remaining members are compelled to move in a manner dictated by the constraints imposed by the linkage under consideration. The constraints which are usual in a plane straight-bar linkage may be stated in two rules:

(*a*) The length and/or orientation of the members of a linkage always change in such a way as to maintain a certain linear combination of vectors equal to zero. This linear combination of vectors may be, for example, the sum of all the vectors representing the sides of a closed straight-bar plane linkage.

(*b*) The length and/or orientation of the members of a linkage always change in such a way as to maintain the angle between two vectors zero.

To construct electrical linkages, in accordance with the present invention, the types of components required are as follows:

(1) Variable gain elements—for changing the length of a member.

(2) Phase shift networks—for changing the orientation of a member.

(3) Summing networks—for obtaining the vector sum of a set of members.

(4) Phase detectors—for determining when the angle between two members is zero.

(5) Linear phase detectors—for determining the angle which one member makes with another.

With these components it is accordingly possible to construct an electrical analogue computer capable of performing all the operations of a straight-bar plane linkage mechanical computer.

The above features and objects of the present invention will become more evident by considering the following description taken in connection with the drawings in which, Fig. 1 diagrammatically represents the proportionality existing between corresponding sides of similar triangles;

Figure 4:
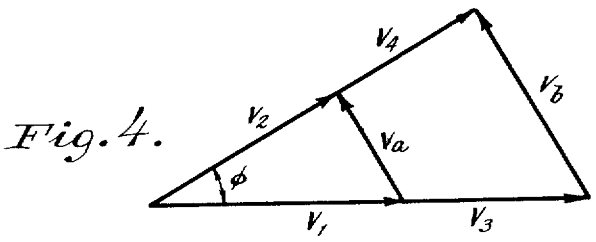
Fig. 4 is a vector diagram illustrating the analogy between the vector summation of alternating voltages and similar triangles.
Figure 5:
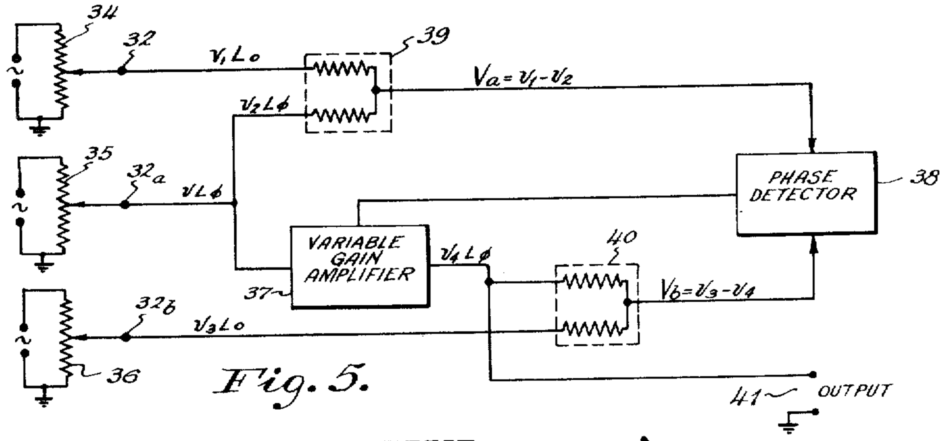
Figure 6:
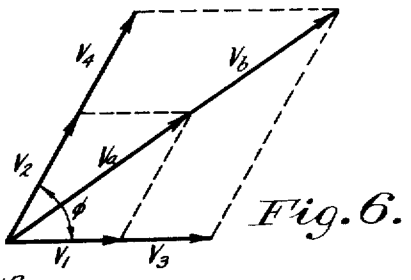
Figure 7:
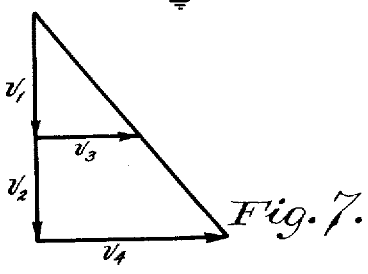
Figure 8:
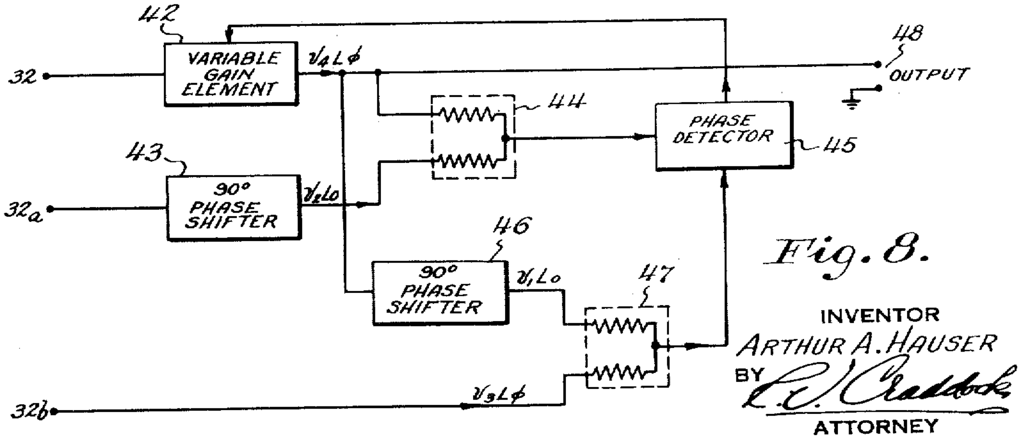

Fig. 5 schematically represents one embodiment of the present invention which functions vectorially to sum electrical voltages and to control the phase relation between the summation voltages along the lines vectorially represented in Fig. 4;

Fig. 6 vectorially represents the functioning of the electrical computer shown in Fig. 5 when the vectors are added, as compared to the subtraction of vectors shown in the diagram of Fig. 4;

Fig. 7 vectorially represents the manner in which a root, such as the square root, of a factor or number may be obtained;

Fig. 8 schematically represents a computer embodying the principles of the present invention which functions in the manner disclosed in Fig. 7 to obtain a root of a given factor.

Figure 9:
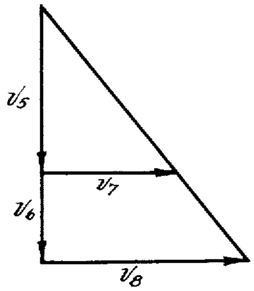
Figure 10:
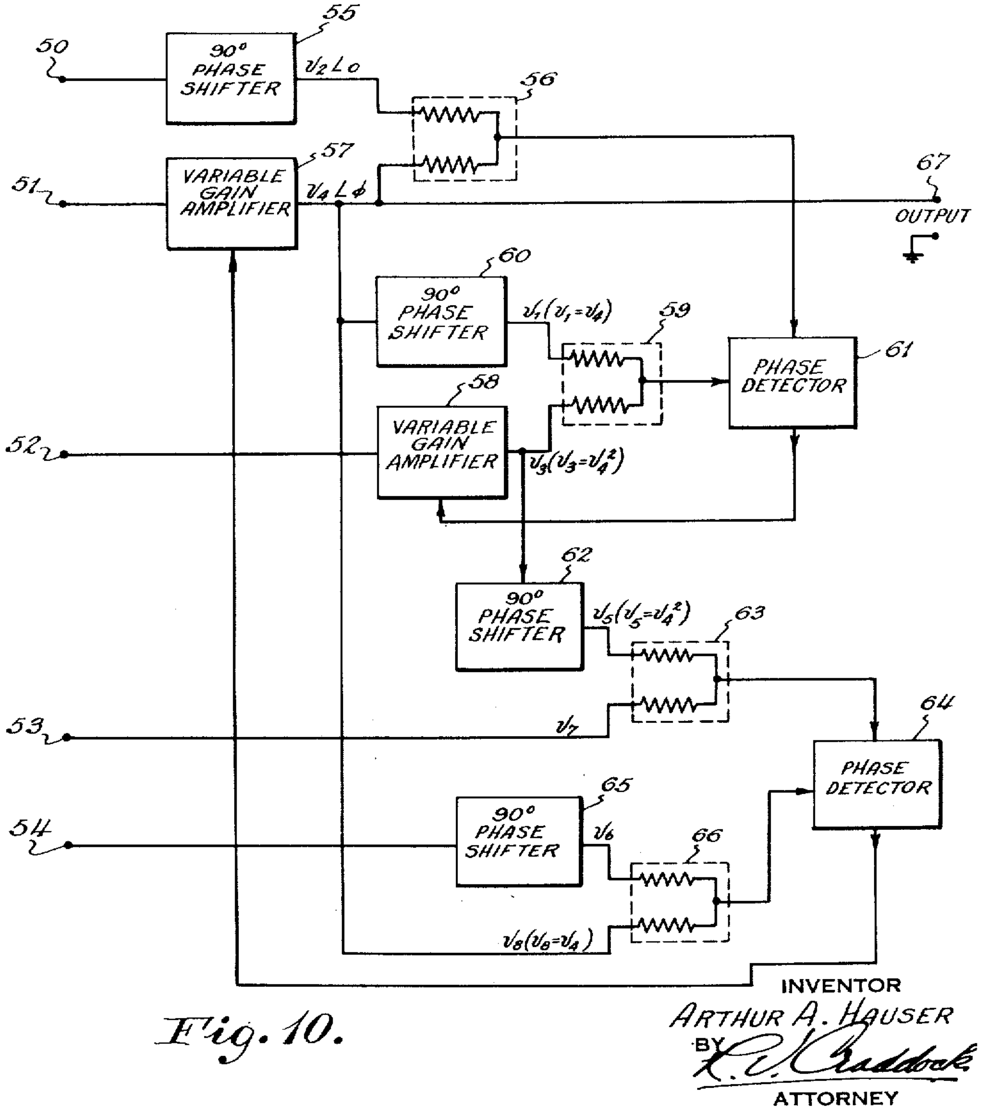

Fig. 9 vectorially illustrates how an odd number root may be extracted such as the cube rot of a number; and Fig. 10 illustrates a further embodiment of the present invention which functions in accordance with the vector analysis of Fig. 9 to obtain the cube root of a given factor or number.

In order to better understand the operation of the present invention, consideration will first be given to the electrical analogue of a mechanical bar linkage multiplier. Such a mechanical multiplier operates upon the principle of physically reconstructing two triangles and applying well known laws of similar triangles.

Figures 1, 2, 3:
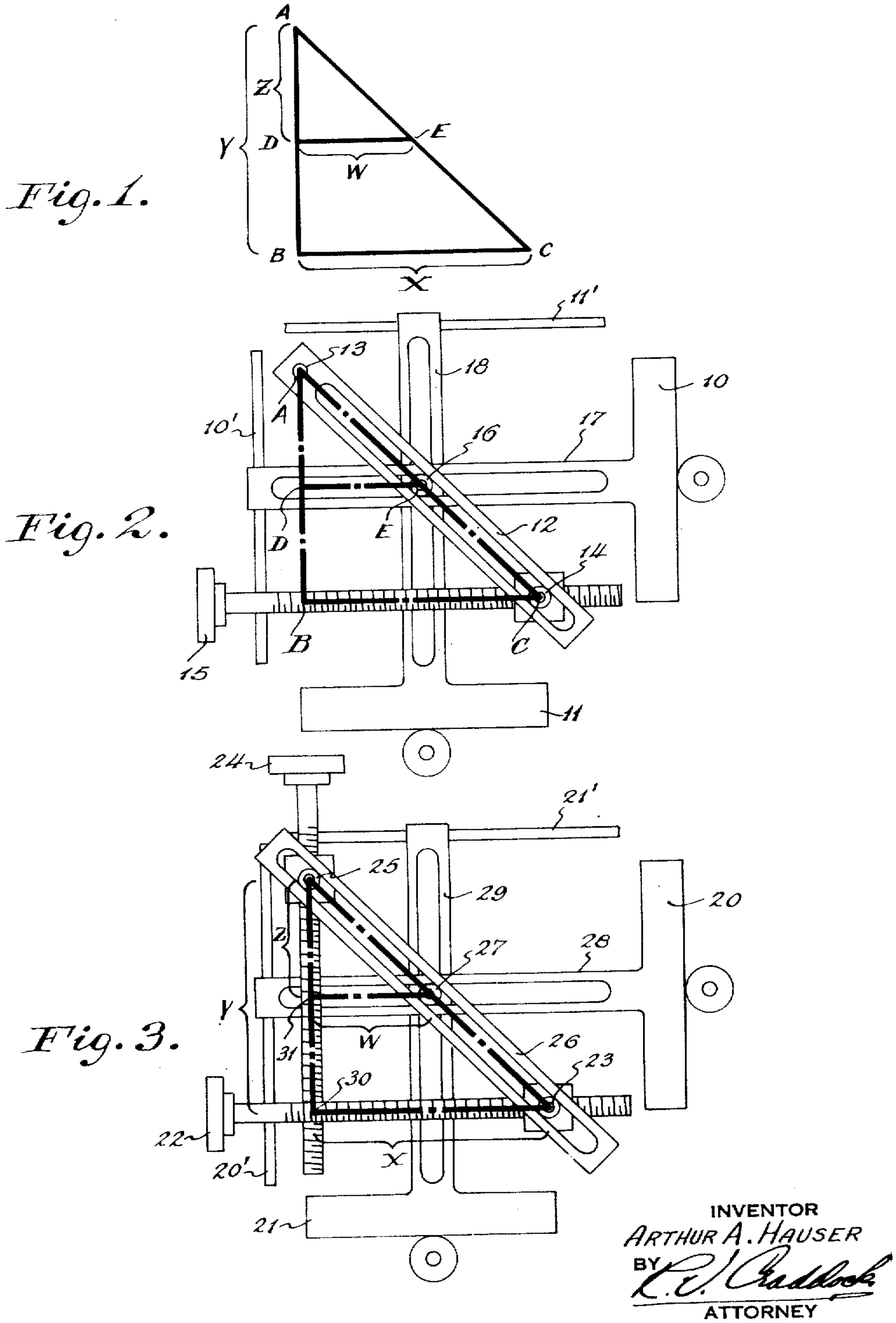
Fig. 2 illustrates somewhat schematically a mechanical-type multiplier.
Fig. 3 represents somewhat schematically a more flexible and improved type of mechanical multiplier.

Referring to Fig. 1, which illustrates two similar triangles DAE and BAC, the relation $$\frac{AD}{AB}=\frac{DE}{BC}$$

may easily be derived. This relation may be more conveniently written in single letter notation $$\frac{W}{X}=\frac{Z}{Y}$$

where $W=ED$, $X=BC$, $Y=AB$, and $Z=AD$. It follows from this last equation that $$W=\frac{XZ}{Y}$$

To utilize this relation it has been the practice to reconstruct the two triangles physically, setting into the physical analogue the sides X, Y and Z and reading off the side W. In such a physical reconstruction, constraints are placed on the members in such a way that regardless of the values of the inputs X, Y and Z, the two triangles always remain similar.

Fig. 2 illustrates one type of mechanical similar triangle multiplier. This mechanical multiplier utilizes an input rack 10 which is free to move vertically along guide rail 10', and is constrained to move at right angles to output rack 11 which is free to move horizontally along guide rail 11'. Cross link 12 is pivoted about fixed point 13. The opposite end of cross link 12 is moved by slide pin 14, which has its horizontal position varied by lead screw 15. Slide pin 16, which is free to move along cross link 12, is also positioned at the intersection of input slide 17 of input rack 10 and output slide 18 of output rack 11. From this configuration it is readily seen that the position of input rack 10 and the position of slide pin 14, which is controlled by lead screw 15, in turn controls the position of output rack 11. It should be noted in this configuration that the vertical distance between fixed pin 13 about which the input cross link 12 pivots, and the axis of the input lead screw 15, remains constant.

It follows from the configuration that $$\frac{ED}{BC}=\frac{AD}{AB}$$

where BC is the distance from slide pin 14 to the vertical projection of pivot 13 on input lead screw 15, AB is the distance between pivot 13 and the axis of input lead screw 15, ED is the horizontal distance between slide pin 16 and the intersection of AB with the longitudinal axis of input slide 17, and AD is the vertical distance from the pivot 13 to the horizontal axis of the input slide 17.

Using a more convenient notation $X=BC$, $Y=AB$, $W=ED$ and $Z=AD$ the following relation is obtained:

$$\frac{X}{Y}=\frac{W}{Z}$$

from which it follows $$W=\frac{XZ}{Y}$$

Since A is fixed in this construction it is readily seen that W is the product of inputs X and Z.

If it is desired to perform division with such a straight-bar linkage computer, or if it is desired to calculate the product of two inputs divided by a third input, a slightly more complicated mechanism may be utilized. Such a device is shown in Fig. 3. In this device, input rack 20, which is free to move vertically along guide rail 20', is oriented at right angles to output rack 21, which is constrained to move horizontally along guide rail 21'. Horizontal lead screw 22 carries slide pin 23 and vertical lead screw 24 carries slide pin 25. These two slide pins 23 and 25 pivotally and slidably engage the lengthwise slot in cross link 26. Slide pin 27, which in a smilar manner engages the slot in cross link 26, is constrained to the intersection of input slide 28 driven by input rack 20 and output slide 29 which drives output rack 21. If X is the distance from the intersection 30 of lead screws 22 and 24 to slide pin 23, and Y is the distance from the intersection 30 of lead screws 22 and 24 to slide pin 25, and W is the distance from the slide pin 27 to the intersection 31 of lead screw 24 and the horizontal axis of input slide 28, and Z is the vertical distance from slide pin 25 to the intersection 31 of lead screw 24 with the horizontal axis of input slide 28, then it follows that $$\frac{Z}{W}=\frac{Y}{X}$$

from which the relationship $$W=\frac{XZ}{Y}$$

is obtained.

It is readily seen from this relationship that by holding either X or Z constant the quotient of the remaining parameter divided by Y is obtained. In addition it is possible to obtain the product of two inputs X and Z divided by the third input Y merely by using all three parameters.

The bar linkage mechanism of these two embodiments utilize a mechanical reconstruction of two similar triangles. The present invention similarly utilizes an electrical reconstruction of two such triangles. In accordance with the present invention, alternating voltages are supplied which are analogous to the various arms in the bar linkage mechanism. In other words, in the electrical analogue of the mechanical computer, geometric significance is assigned to the magnitudes and phases of the alternating voltages. If $V_1$ and $V_2$ designate voltages having magnitudes $v_1$ and $v_2$ and having a phase difference $\phi$ which is not zero, then $V_1$ and $V_2$ may be considered as vectors forming two sides of a triangle as shown in Fig. 4. The vector difference $V_a=V_1-V_2$ is, of course, the third side. If $V_3$ be any other voltage having the same phase as $V_1$ but being of length $v_3$ different, in general, from either $v_1$ or $v_2$ and if $V_4$ be a voltage constrained to have the same phase as $V_2$ but which may be varied in magnitude, that is, in length, $v_4$, then the vector $$V_b=V_3-V_4$$

represents the third side of this triangle. If the length $v_4$ of the vector voltage $V_4$ is varied (but its phase is held fixed) then the phase of $V_b$ will change. When $v_4$ has been adjusted so that $V_a$ and $V_b$ are in phase, then the two triangles are similar. It follows from the geometric principle which states that corresponding sides of similar triangles are proportional, that $$v_4=\frac{v_2 \cdot v_3}{v_1}$$

Thus, if $v_1$ is fixed voltage, $v_4$ is the product of the other two inputs $v_2$ and $v_3$; if $v_2$ is held fixed then $v_4$ is the quotient of $v_3$ and $v_1$. If $v_2$, $v_3$ and $v_1$ are all allowed to vary, then $v_4$ is the product of the two inputs $v_2$ and $v_3$ divided by the third input $v_1$.

Fig 5 illustrates diagrammatically a system which electrically reconstructs the vectorial representation of Fig. 4. In Fig. 5 there is shown three input terminals 32, 32a and 32b to which respectively are applied three alternating voltages $v_1$, $v$, and $v_3$, $v_1$ and $v_3$ having phase 0 and $v$ having phase $\phi$. $v_1\angle 0$ and $v_2\angle\phi$, derived from input $v$, combine to form the difference vector $V_a$ which enters the phase detector. $v_3\angle 0$ and $v_4\angle\phi$, which is the output of a variable gain amplifier, combine to form the difference vector $V_b$ which also enters the phase detector. The output of the phase detector, whose magnitude is proportional to the difference in phase between $V_a$ and $V_b$ serves to control the gain of the variable gain amplifier. In order to operate properly, it is seen that if the phase of $V_a$ is less than $V_b$ the error voltage must increase the gain of the variable gain amplifier. This will cause the magnitude of $v_4$ to become greater and thereby reduce the phase of $V_b$ until it is in phase with $V_a$. At such a time the phase detector has a minimum output and the following result obtains:

$$v_4=\frac{v_2 \cdot v_3}{v_1}$$

In Fig. 5, I have shown voltage $v_1$ as derived from a source of alternating voltage such as an alternating current energized potentiometer 34, the output of which may be fixed or varied in accordance with the value of a factor to be multiplied, divided, or the like, and is applied to input terminal 32. The voltage $v$ may similarly be derived from a potentiometer 35 and applied to input 32*a*. This voltage may be varied or fixed in magnitude, depending upon the nature of the computation to be performed. The voltage $v_3$ may also be derived from a potentiometer 36 and this voltage may be fixed in certain cases, depending upon the type of computation, or may be varied in magnitude in accordance with the value of a second factor entering into the computation and is applied to terminal 32*b*. As indicated in Fig. 5, the voltages $v_1$ and $v_3$ are of the same phase, phase $o$, whereas the voltage $v$ is of a second phase, phase $\phi$, differing from the phase of the voltages $v_1$ and $v_3$. The variable-gain amplifier 37 constitutes a variable source of variable magnitude voltage and, in the embodiment illustrated in Fig. 5, provides the voltage output of the computer which is proportional to the product of $v_2$ and $v_3$ when $v_1$ is considered a constant. Moreover, $v_1$ may be a variable proportional to a third factor if the computation to be performed involves division, in which case $v_2$ or $v_3$ may be fixed in magnitude, as a constant, while the other is varied, or a multiplication of two variables and the division of the product by a variable may be carried out.

Further in connection with Fig. 5, it will be noted that the voltages $v_1$ and $v_2$ are applied to a vector summing network indicated generally at 39, the output of which is supplied to a phase detector 38. Likewise, the voltages $v_3$ and $v_4$ are applied to a second vector summing network 40, the output of which is supplied to the phase detector 38. The phase detector 38 may be of any conventional construction and serves to supply a voltage output having a magnitude and polarity or phase sense depending upon the magnitude of the phase disagreement between the vector summation voltages $V_a$ and $V_b$ and the sign of such phase disagreement, that is, whether the phase of $V_a$ leads or lags the phase of $V_b$.

Fig. 6 discloses by way of vector analysis how the system of Fig. 5 may function in an alternative manner. Instead of performing vector subtraction as discussed in connection with Fig. 5 and as vectorially illustrated in Fig. 4, the voltages $v_1$ and $v_3$ and similiarly the voltages $v_2$ and $v_4$ may be vectorially added, in which case the diagram of such vector additions will appear as shown in Fig. 6. In this figure, the phase of vector $V_a$ which represents the vector sum of the voltages $v_1$ and $v_2$ or the vectors $V_1$ and $V_2$ is compared with the phase of $V_b$ which is the sum of the voltages $v_3$ and $v_4$ or the vectors $V_3$ and $V_4$. In the diagram of Fig. 6, the summation voltages $V_a$ and $V_b$ are illustrated as in phase. Under such conditions the magnitude of the output $V_4$ of the variable-gain amplifier will satisfy the demands of the equation since $V_a$ and $V_b$ are in phase and will therefore be proportional to the product of voltages $v_2$ and $v_3$. However, should phase disagreement exist, the output of the phase detector 38 will be proportional to the magnitude of such disagreement and will control the gain of the variable-gain amplifier 37 in such manner, either by increasing or decreasing the magnitude of voltage $v_4$, that the phase of the vector summation voltages $V_a$ and $V_b$ will become coincident. In Fig. 6 it will be seen that if $V_b$ leads $V_a$ in phase, the gain of the amplifier will be reduced to bring about phase coincidence, and if the vector $V_a$ should lead $V_b$ in phase, then the gain of the amplifier will be increased to bring about phase coincidence of the summation vectors.

The operation of the computer shown in Fig. 5 may be briefly set forth as follows. Voltages $v_1$ and $v_2$ may be fixed or variable as hereinabove pointed out and are of different electrical phases. Preferably $v_2$ is derived from the same voltage source as is employed in feeding the variable gain amplifier 37 since both of these voltages should be of the same phase. Further, voltage $v_3$ is of the same phase as $v_1$. Assuming that we wish to compute the product of $v_2$ and $v_3$, then $v_1$ is a fixed magnitude representing a constant, and voltages $v_2$ and $v_3$ are controlled in amplitude in accordance with the values of the two factors to be multiplied. With reference to Fig. 4, it will be seen that voltages $v_1$ and $v_2$ in magnitude are analogous to the lengths of two sides of a first triangle. These voltages are therefore vectorially summed by means of the summing circuit 39 to produce an output voltage $V_a$, which is proportional to the vector difference between the voltages $v_1$ and $v_2$. By these means, we have in effect created by analogy a first triangle. The magnitudes of the voltage $v_3$ and the voltage $v_4$, which is derived from the variable gain amplifier 37, being out of phase are analogous to the lengths of two sides of a second triangle. The voltages $v_3$ and $v_4$ are vectorially summed by means of the summing circuit 40 to provide in the output thereof a voltage $V_b$ which is proportional to the vector difference of the voltages $v_3$ and $v_4$. By means of the last described circuit, we have created by analogy a second triangle which will be similar to the first triangle if the phase of the resultant vectors $V_a$ and $V_b$ are coincident. This is determined by means of the phase detector 38 which supplies in its output a control voltage proportional in magnitude to the magnitude of phase disagreement between the voltages $V_a$ and $V_b$ and the sign or phase sense of this control voltage will depend upon the phase relation between the two vector summation voltages. The output of the phase detector is supplied to the variable gain amplifier to decrease or increase its gain and in such a manner as to cause the vector resultant $V_b$ to move into phase with the vector $V_a$. When phase coincidence of these summation vectors occurs, then the magnitude of the voltage $v_4$ will be proportional to the product of the voltages $v_2$ and $v_3$. In other words, $v_4$ will equal $v_2$ times $v_3$ when $v_1$ is a constant as proven in Fig. 4. Hence, the output of the variable gain amplifier is connected to the output terminal 41. Division may similarly be performed by varying $v_1$ and holding $v_2$ or $v_3$ constant, or, varying both $v_2$ and $v_3$ depending upon the nature of the computation to be performed.

In the foregoing I have demonstrated that the summing networks 39 and 40 may perform vector addition or vector subtraction and that, in either case, the manners of operation of the computer circuit are the same. Hence, it will be understood that where I refer to vectorially summing two voltages in the present specification and in the claims, I intend to include both vector additions and vector subtractions.

From the foregoing description of Fig. 5, it should be quite clear that with the present computer I may obtain any desired power of a number or factor such as $x^2$ or $x^n$ where $x$ is the factor. This may be accomplished in the embodiment shown in Fig. 5 by making the voltages $v_2$ and $v_3$ equal. In such case, where $v_1$ equals a constant, the following equation results:

$$v_4=v_2\times v_3,\text{ or, } v_4=v_2^2$$

If it is desired to obtain a higher power, such as the cube, then the output of the computer of Fig. 5 is supplied to a second similar computer in which one of the input voltages is the output of the first computer and one of the original voltages such as $v_2$ or $v_3$ is likewise supplied as an input. In the second computer, ordinary multiplication is performed as first described in connection with Fig. 5, the voltage $v_2^2$ being multiplied by the voltage $v_2$ to produce in the output of the second multiplier a voltage proportional to $v_2^3$. Higher powers of a number or factor may be obtained as above described simply by arranging successive computing devices of the character shown in Fig. 5, the output of preceding devices constituting the input of succeeding devices.

In accordance with my invention a root of a number or factor may be obtained. In Fig. 7 I have illustrated by means of vectors how the square root of a number may be obtained and in Fig. 8 I have shown a modification of the present invention which functions to provide in its output a voltage proportional to the square root of an input. Referring first to Fig. 7, I have represented two similar triangles having the sides thereof analogous to voltages $v_1$, $v_2$, $v_3$, and $v_4$. For the sake of clearness the vectors $v_1$ and $v_2$ are represented as in-phase voltages and the vectors $v_3$ and $v_4$ are likewise in-phase voltages but shifted through 90° relative to the phase of voltages $v_1$ and $v_2$. If we assume that the voltage $v_3$ is the input voltage which is proportional to a factor whose square root is to be computed and that $v_2$ is a constant or fixed magnitude voltage, then in accordance with the foregoing equations which apply to similar triangles, it is merely necessary to make $v_1$ equal to $v_4$. Under these conditions $$v_3=v_4\times v_1$$

or $$v_4^2=v_3$$

or $$v_4=\sqrt{v_3}$$

The computer shown in Fig. 8 is designed to obtain the square root of an input value. In this figure, the input terminals 32, 32*a* and 32*b* are adapted to be connected with sources of voltage such as those illustrated in Fig. 5. However, it is assumed in Fig. 8 that the input voltages are of the same phase. Any suitable magnitude of voltage is supplied to the terminal 32 which, in turn, is connected to a variable gain element such as a variable gain amplifier 42. A voltage of fixed magnitude is supplied to the terminal 32*a* which is connected with a phase shifting network 43 herein illustrated as designed to effect a phase shift through 90° and the output of phase shifter 43 may be represented as voltage $v_2$ having the phase angle 0. The third input terminal 32*b* has supplied to it a voltage which is proportional in magnitude to the factor to be computed, which, as in Fig. 7, is represented as voltage $v_3$ having a phase $\phi$. Since the voltages supplied to these input terminals have the same phase, we may represent the output of the variable gain element 42 as voltage $v_4$ having the phase $\phi$. The outputs of the variable gain element 42 and phase shifter 43 are supplied to a vector summing network 44 the output of which is in turn supplied to a phase detector 45. Similarly the voltage $v_4$, or the output of the variable gain element 42 is supplied to a second phase shifting network 46, which is designed to effect a phase shift of 90° so that its output is of phase 0 or in phase with the voltage $v_2$. Although the output of phase shifter 46 is a voltage of the same magnitude as voltage $v_4$, its phase is the same as voltage $v_2$ and, in accordance with the designations employed in Fig. 7, may be designated as voltage $v_1$. This voltage $v_1$ together with the voltage $v_3$ is supplied to a second vector summing means or network 47, the output of which is supplied to the phase detector 45. The output of the phase detector is of the same character as that hereinbefore described in connection with Fig. 5 and is connected in controlling relation to the variable gain element 42, to so control the gain thereof that the vector summation voltages will be brought into phase coincidence. When phase coincidence occurs, then the output of the variable gain element which is connected to the output terminal 48 will be proportional to the square root of the voltage $v_3$. This is so because the voltage $v_1$ and the voltage $v_4$ are made equal in magnitude but respectively of the same phase as the voltages $v_2$ and $v_3$. The functional operation of the circuit of Fig. 8 is the same as that of Fig. 5.

Where it is desired to obtain a higher and even root of a factor, the computer of Fig. 8 may be employed in tandem with a similar computer, the output of the first computer being fed into the input of the second computer. In this manner any even root of a number may be obtained. However, a more complex system must be employed to obtain an odd root of a factor and in Figs. 9 and 10 I have illustrated one embodiment of my invention wherein the cube root of a factor may be computed. Obviously, once an odd or cube root is obtained, it is a rather straightforward matter to obtain higher order roots.

Referring first to Fig. 7, it will be seen that the computer of the present invention may be so arranged as to provide an output voltage $v_3$ which is proportional to the square of voltage $v_4$. To do this as hereinbefore described, the voltage $v_2$ is considered to be a constant and the voltages $v_1$ and $v_4$ although of different phases are made equal in magnitude. The voltages $v_1$ and $v_2$ are in phase while the voltages $v_3$ and $v_4$ are also in phase but in a phase differing from the first phase, for example, 90° phase displaced therefrom, as illustrated in Fig. 7. Assuming that the voltage $v_3$ is the input voltage, then the following relation will exist:

$$v_1\times v_4=v_2\times v_3$$

Assuming $v_2$ equals a constant and $v_1$ equals $v_4$, then $$v_3=v_4^2$$

The odd root extracting computer of Fig. 10 comprises circuitry which functions to compute the value of $v_3$ in terms of $v_4$ using an electrical analogue to the similar triangles shown in Fig. 7. Further, the value of voltage $v_3$ is employed in additional circuitry to obtain the cube root of a given number, and this may be more readily understood by a further triangle analysis as disclosed in Fig. 9. It will be seen that the similar triangles of Fig. 9 are like those shown in Fig. 7. However, different voltage designations have been applied thereto in order more clearly to carry out the present analysis. Let us assume that in Fig. 9 the voltage $v_7$ is the input voltage which is proportional to the number or factor to be raised to the one-third power. Also, consider $v_8$ as the output and assume that $v_6$ is equal to a constant, then the following relationship will exist:

$$v_8\times v_5=v_7$$

If the voltage $v_5$ is derived from the output of a computing circuit functioning in the manner shown in Fig. 7, then the following relationship will exist:

$$v_5=v_3$$

or, since $v_3=v_4^2$ $$v_5=v_4^2$$

With the foregoing relationship, if we make $v_4$ equal to $v_8$, and substitute for $v_5$ its equivalent $v_4^2$, then the foregoing equation will be as follows:

$$v_8\times v_4^2=v_7$$

or $$v_4^3=v_7$$

or $$v_4=v_7^{1/3}$$

Hence, a computing circuit which functions in the foregoing manner will provide in its output a voltage proportional to the cube root of a given input voltage or value. Such a computing circuit is shown in Fig. 10.

In describing the computer of Fig. 10, it will be assumed that voltages of the same phase are applied to the input terminals 51, 52, 53 and 54. These terminals have been shown as separate inputs in order to aid in a clearer understanding of the circuitry, and it will further be understood that the voltages may be derived from suitable voltage sources such as is shown in Fig. 5 or may be derived in any conventional manner. Particularly, the input voltage which is applied to the terminal 53 may be derived from any source providing a voltage proportional in amplitude to the factor or number to be acted upon. In describing Fig. 10, voltage designations corresponding to the vector designations of Fig. 7 and 9 will be adopted so that the comparison of the functioning of the circuit with the similar triangle analogue will be readily apparent. In accordance with the foregoing vector analysis, we will assume that voltage $v_2$ is a constant (see Fig. 7), and this voltage is applied to input terminal 51 and then phase-shifted, for example, 90° by means of phase shifter 55 and then supplied to a first vector summing network 56. The 90° phase shift has been indicated since right triangles have been employed in the vector diagrams. A source of voltage is likewise applied to the input terminal 51 from whence it is supplied to a variable gain element or amplifier 57, the output of which may be designated as the variable voltage $v_4$ which is also supplied to the summing circuit 56. The output of the circuit 56 therefore represents the vector summation of the voltages $v_2$ and $v_4$ and, in the example herein illustrated, is proportional to the vector difference between these voltages.

The input terminal 52 is likewise connected to a suitable voltage source and is connected with the input of a second variable gain element or amplifier 58. The output of the amplifier 58 is designated as the voltage $v_3$ which is supplied to a second vector summing circuit 59. The voltage output of variable gain amplifier 57, that is voltage $v_4$, is first phase-shifted through 90° into phase with $v_2$ by means of phase shifter 60 and then applied to the summing network 59. The output of network 59 will represent the vector difference between the voltages $v_3$ and $v_1$. The outputs of both summing networks 56 and 59 are then supplied to a phase detector 61, which determines the amount of phase disagreement between the summation voltages and provides an output proportional in magnitude and polarity, or phase sense, dependent upon the amount of phase difference and the direction thereof. The output of the phase detector is supplied in controlling relation to the variable gain amplifier 58 so that the magnitude of voltage $v_3$ will be adjusted to bring the summation voltages into phase agreement. When this condition obtains, the requirements of the equal triangle analogue are met and the equation $$v_3 = v_1 \times v_4$$

will hold true. However, it will be noted that $v_1$ has been made equal in magnitude to $v_4$ since they are the same voltage output from the variable gain amplifier 57. Therefore, since $v_1 = v_4$, $$v_3 = v_4^2$$

and the circuit so far described will function in the manner set forth in Fig. 7 to provide a voltage proportional to the square of the voltage $v_3$.

The voltage $v_3$ is then employed as the voltage $v_5$ to obtain the cube root of an input value in the manner vectorially illustrated in Fig. 9. This is accomplished as follows. The voltage $v_3$ is supplied through a 90° phase-shifting circuit 62 to a third vector summing network 63. The voltage so supplied to network 63 is represented as the voltage $v_5$ in Fig. 10. The input voltage which is proportional in magnitude to the factor or number to be raised to the one-third power is applied to the input terminal 53. This voltage is 90° out-of-phase with the voltage $v_5$ and is represented as the voltage $v_7$ or the input voltage. These voltages, $v_5$ and $v_7$, are vectorially summed in the summing network 63 to supply a voltage in its output proportional to the vector difference between voltages $v_5$ and $v_7$. The output of network 63 is applied to a second phase detector 64. In the mathematical demonstration of the theory of the computer of Fig. 10, the voltage $v_6$ was assumed to be a constant. As shown in Fig. 9 this voltage is in phase with the voltage $v_5$ and is applied to the input terminal 54 as a constant amplitude voltage. A phase-shifter 65 serves to phase shift the applied voltage into phase with the voltage $v_5$ and the phase-shifted voltage is applied to a fourth vector summing network 66. The voltage $v_8$, which we have demonstrated is equal to the voltage $v_4$ in magnitude, is derived from the output of the variable gain amplifier 57, and, as illustrated, is also applied to the vector summing network 66. The output of this network represents the vector difference between the voltages $v_6$ and $v_8$ and is applied to the phase detector 64. The phase detector 64 functions like the phase detector 61 and its output is applied in controlling relation to the variable gain amplifier 57. When phase coincidence exists between the outputs of the summing networks 63 and 66, then the output of the variable gain amplifier 57 will be of such magnitude as to satisfy the requirements of the similar triangles shown in Fig. 9. Since voltage $v_8$ is made equal to voltage $v_4$ then the output of the variable gain amplifier 57, which is also applied to the output terminal 67, will be proportional to the cube root of the voltage $v_7$ which is the input voltage applied to the input terminal 53.

In the foregoing, I have referred to 90° phase-shifting devices, mainly for illustration purposes, since it will be understood that any desired phase shift may be effected, provided the phases of the voltages are correlated in the manner illustrated in the various vector representations in the drawings to produce similar triangle analogues. Conventional phase-shifting devices may be employed such as those embodying a transformer feeding into a resistance-capacitance network to provide from zero degrees to approximately 180 degrees of phase shift.

The vector summation circuits may comprise input or adding resistances to which the input voltages are respectively applied, which in turn are connected with the grid of an electron tube embodied in a highly degenerative amplifier stage which operates to provide isolation and feeds into a phase shift balancing network comprising a resistance-capacitance network. The latter RC networks of the two circuits function to balance out any unequal phase shifts in the circuits which connect the adding resistors to the phase detector.

The phase detector may be of the pulsed "flop-over" type which is an adaptation of an Eccles-Jordan multivibrator. The input voltages which are to be phase detected, are first applied to pulse-forming amplifiers and the outputs of these amplifiers are applied to the actual phase detector. These amplifiers are preferably clipping amplifiers, the clipping being accomplished by means of balancing diode clippers to provide symmetrical clipping. The diode clipper is preferably fed from a constant output, initial or preamplifier stage for the purpose of preventing phase shift with variations in amplitude of the input signal. Pulses may be formed from the relatively rectangular waves by passing them through a low-time constant RC network. Furthermore, one of the two pulse-forming amplifiers feeding into one of the phase detectors preferably feeds through a phase inverter to provide 180° spaced positive pulses when the input voltages are actually in phase. The output from one of the pulse-forming amplifiers and the output from the phase inverter are supplied to the "flop-over" circuit which comprises, in the usual conventional manner, a pair of tubes each having its grid connected through a dropping resistor to the plate of the other tube. A negative bias is supplied to the grids so that when one tube conducts freely, the other tube is cut off. Hence, a switching action is obtained which is entirely controlled by the triggering pulses applied thereto. Furthermore, the pulses from the pulse-forming amplifiers are preferably passed through a device for passing only positive pulses. This device may comprise germanium crystals or the like, and a suitable blocking network having a low-time constant may be connected between the outputs of the crystals and the "flop-over" circuit to prevent grid bias from affecting the proper operation of the crystals. Since the two input pulses to the "flop-over" circuit are positive and 180 degrees out of phase when the input pulses are in phase, the "flop-over" circuit will be triggered at certain intervals and the plate voltages, plotted with respect to time, will be represented by a symmetrical rectangular wave. Any phase difference between the inputs will result in an asymmetrical rectangular wave, the degree of asymmetry being proportional to the phase difference.

The output of the "flop-over" circuit may be applied through a blocking condenser to a network comprising two cross-connected diodes and two capacitors in such manner that one of the capacitors will charge up to the peak positive value of the rectangular wave while the other will charge to the peak negative value. The voltages on these capacitors are then differentially combined, for example, on an output resistor. If the two input voltages are in phase and the rectangular wave is symmetrical as above pointed out, the resultant voltage on said resistor will be zero. When a phase difference exists, the rectangular wave becomes asymmetrical and then the resultant voltage across the output resistor will be proportional to the amount of asymmetry and will be of a polarity dependent upon which of the two input voltages leads or lags the other.

An example of a suitable phase detector which may be employed in connection with the present invention is disclosed in U. S. Patent 2,370,692, in the name of James E. Shepherd, which issued March 6, 1945, and is assigned to the assignee of the present invention.

Moreover, various forms of variable gain elements may be employed in the present computer. These may take the form of variable gain electronic amplifiers embodying variable gain tubes. Carbon piles may also be employed as variable gain devices, the control voltage being applied to a solenoid which in turn controls the resistance of the pile and therefore the voltage gain of the device. Potentiometers may also be employed and these too may be driven by solenoids or other electrical prime movers under the control of a control voltage. Alternatively, a relay may be used wherein, for example, the contact are connected to supply the input voltage, fed through a first resistor, either across a second resistor or to ground, the first and second resistors being series connected above ground so that the average voltage across the second resistor will be proportional to the time intervals during which the relay connects the applied voltage across the resistor or to ground. In this case, the amplitude of the control voltage determines the relative lengths of the off-on cycles of the relay. It may also be mentioned that temperature-sensitive resistors may be used and also magnetic flux-sensitive resistors. In all cases, these devices may function as variable gain devices ot provide an output voltage which varies in magnitude in accordance with a control voltage. A suitable form of variable gain element or amplifier is illustrated in U. S. Patent 2,532,297, in the name of Raymond C. Goertz, issued December 5, 1950, and assigned to the assignee of the present invention.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A computer comprising a source of first, second and third voltages, at least one of said voltages being of variable magnitude and proportional to the magnitude of a factor to be employed in the computation, two of said voltages being of like electrical phase and the third being of a different second electrical phase, a source of fourth voltage of said second phase and means for varying the magnitude thereof, means for vectorially summing two out-of-phase voltages and means for vectorially summing the remaining two voltages, a phase detector connected to receive the summation voltages and having an output proportional to the phase difference therebetween, and means connected to be controlled by the output of said phase detector for varying the magnitude of the output of said fourth voltage source in such manner as to reduce the output of said phase detector to zero.

2. A computer comprising a source of first and second voltages proportional, respectively, in magnitude to first and second factors and of different electrical phase, a source of a third voltage of fixed magnitude and of a phase corresponding to one of said first and second voltages, a variable gain amplifier connected to receive said third voltage and to supply in its output a fourth voltage, means for vectorially summing two out-of-phase voltages, means for vectorially summing the remaining two voltages, a phase detector for determining the phase difference between the summation voltages, and means connected to be controlled by the output of said phase detector for controlling the gain of said amplifier in such manner as to reduce the output of the phase detector to zero.

3. An electrical computer having three input terminals, each adapted to have a voltage applied thereto, and an output terminal, a first voltage summing means connected to two of said input terminals, a further source of voltage and means for varying the magnitude of the output thereof, a second voltage summing means connected to the output of said further source of voltage and to the third input terminal, phase detecting means connected to receive the outputs of said summing means and adapted to supply an output proportional to the phase difference therebetween, and means connecting the output of said phase detector and said further voltage source varying means for varying the magnitude of the output of said further source of voltage, said output terminal being connected with the output of said further source of voltage.

4. An electrical computer of the character recited in claim 3 in which the variable source of voltage comprises a variable gain amplifier and in which the output of the phase detector is connected to control the gain of said amplifier.

5. An electrical computer of the character recited in claim 4 in which the input to the amplifier is connected to one of said input terminals.

6. An electrical computer having three input terminals and an output terminal, a first voltage source connected to a first of said input terminals, a second voltage source connected to a second of said input terminals, a third voltage source connected to the third of said input terminals, said first and third voltage sources being of like electrical phase and two of said voltage sources being variable in magnitude in accordance with desired input values to be employed in the computation, the second voltage source being of an electrical phase differing from said first and third voltage sources, a first voltage summing means connected to the first and second input terminals, a variable gain amplifier having its input connected to said second input terminal, a second voltage summing means connected with the output of said variable gain amplifier and with said third input terminal, a phase detector connected with the outputs of said first and second summing means, and means for connecting the output of said phase detector to control the gain of said variable gain amplifier, said output terminal being connected with the output of said variable gain amplifier.

7. In an electrical computing apparatus means for supplying a first pair of voltage components having the same electrical phase, means for supplying a second pair of voltage components having the same electrical phase, the phase of said second pair of voltages being different from the phase of said first pair of voltages, means for vectorially summing two of the voltage components of said first and second pairs of voltage components having dissimilar phases, means for vectorially summing the remaining two voltage components of said first and second pairs of voltage components, a phase detector responsive to the phase difference between said summation voltages for supplying an output in accordance therewith, a variable gain amplifier having one of said voltage components connected as an input thereto and having its output controlled in accordance with the output of said phase detector for varying the magnitude of said voltage component until the phase difference between the summation voltages is zero.

8. In an electrical computing apparatus, means for providing a plurality of alternating voltages having magnitudes and phases representing vectors relatively disposed as two sides of first and second triangles, a variable gain amplifier connected to receive at least one of said voltages for controlling the magnitude of the same, said one voltage corresponding to one side of the first of said triangles in accordance with the magnitude of a factor to be computed, means for providing two resultant voltages each having a magnitude and phase respectively dependent upon the vector sum of the voltages corresponding to the sides of said first and second triangles, a phase detector responsive to each of said resultant voltages for providing an output corresponding to the phase difference therebetween, and means connecting the output of said phase detector to said variable gain amplifier for varying the magnitude of said one voltage until the phase angle between said two resultant voltages is zero, whereby to render said two triangles similar.

References Cited in the file of this patent

UNITED STATES PATENTS

| | | |
|---|---|---|
| 2,319,106 | Blackburn | May 11, 1943 |
| 2,427,463 | Klemperer et al. | Sept. 16, 1947 |
| 2,472,129 | Streeter | June 7, 1949 |
| 2,568,927 | Morrison | Sept. 25, 1951 |
| 2,576,818 | Waynick | Nov. 27, 1951 |
| 2,581,438 | Palmer | Jan. 8, 1952 |
| 2,733,004 | Richardson | Jan. 31, 1956 |

FOREIGN PATENTS

| | | |
|---|---|---|
| 620,867 | Great Britain | Mar. 31, 1949 |

OTHER REFERENCES

An Electrical Algebraic Equation Solver, D. L. Herr and R. L. Graham; "Review of Scientific Instruments," October 1938, pages 310–315.

"Electron-Tube Circuits," Samuel Seely, McGraw-Hill, 1950, Figures 17–18 relied on.

"Electronic Computers for Division, Multiplication, Squaring, etc.," Sack, Beer and Boehmer, National Defense Research Committee, Report 435, declassified April 2, 1946. Figures 9 and 10 relied upon.

U. S. DEPARTMENT OF COMMERCE

PATENT OFFICE

CERTIFICATE OF CORRECTION

Patent No. 2,812,132 Arthur A. Hauser November 5, 1957

It is hereby certified that error appears in the printed specification of the above numbered patent requiring correction and that the said Letters Patent should read as corrected below.

Column 2, line 53, for "cube rot" read --cube root--; column 3, line 66, for "smilar" read --similar--; column 4, line 47, before "fixed" insert --a--; column 5, line 27, for "the product" read --their product--; column 11, line 38 for "contact" read --contacts--; line 50, for "ot" read --to--; column 13, line 3, before "voltage" insert --one--.

Signed and sealed this 24th day of June 1958.

(SEAL)
Attest:

KARL H. AXLINE

Attesting Officer

ROBERT C. WATSON
Commissioner of Patents